United States Patent
Wang et al.

(10) Patent No.: US 11,073,145 B2
(45) Date of Patent: Jul. 27, 2021

(54) PRESSURE PULSATION TRAPS

(71) Applicant: Trane International Inc., Davidson, NC (US)

(72) Inventors: Percy F. Wang, Tyler, TX (US); Yi Liu, Concord, NC (US)

(73) Assignee: Trane International Inc., Davidson, NC (US)

( * ) Notice: Subject to any disclaimer, the term of this patent is extended or adjusted under 35 U.S.C. 154(b) by 369 days.

(21) Appl. No.: 15/885,356

(22) Filed: Jan. 31, 2018

(65) Prior Publication Data

US 2019/0234390 A1 Aug. 1, 2019

(51) Int. Cl.
| | |
|---|---|
| *F04B 39/00* | (2006.01) |
| *F16L 55/05* | (2006.01) |
| *F16L 55/04* | (2006.01) |
| *F25B 31/02* | (2006.01) |
| *F24F 130/40* | (2018.01) |

(52) U.S. Cl.
CPC ...... *F04B 39/0066* (2013.01); *F04B 39/0055* (2013.01); *F16L 55/05* (2013.01); *F25B 31/02* (2013.01); *F24F 2130/40* (2018.01); *F25B 2500/13* (2013.01)

(58) Field of Classification Search
CPC ........ F01N 1/02; F01N 1/023; F04B 39/0066; F04B 39/0027; F16L 55/05; F16L 55/04; F24F 2130/40
See application file for complete search history.

(56) References Cited

U.S. PATENT DOCUMENTS

| | | | | |
|---|---|---|---|---|
| 2,075,263 | A * | 3/1937 | Bourne | F16L 55/033 181/256 |
| 2,297,046 | A * | 9/1942 | Bourne | F01N 1/006 181/250 |
| 3,323,305 | A * | 6/1967 | Klees | F16L 55/04 181/207 |
| 3,396,812 | A * | 8/1968 | Wilcox | F01N 1/06 181/250 |
| 3,655,011 | A * | 4/1972 | Willett | F01N 1/02 181/228 |
| 5,317,112 | A * | 5/1994 | Lee | F02M 35/1255 181/250 |
| 6,009,705 | A * | 1/2000 | Arnott | F01N 1/02 60/312 |
| 6,234,758 | B1* | 5/2001 | Pawelski | F04B 11/0016 417/26 |
| 6,508,331 | B1* | 1/2003 | Stuart | F02M 35/125 123/184.57 |
| 7,036,328 | B2* | 5/2006 | Shin | F25B 13/00 181/207 |

(Continued)

FOREIGN PATENT DOCUMENTS

JP       60030463  A  *  2/1985  ...............  F01N 1/02

*Primary Examiner* — Edgardo San Martin
(74) *Attorney, Agent, or Firm* — Womble Bond Dickinson (US) LLP

(57) ABSTRACT

A pressure pulsation trap is provided. The pressure pulsation trap includes a channel extending from an inlet to an outlet, and a plurality of branches extending from the channel, each of the branches having different lengths than one another. The different lengths are configured such that the branches attenuate noise and/or vibration over a range of operating frequencies.

18 Claims, 7 Drawing Sheets

(56) References Cited

U.S. PATENT DOCUMENTS

| | | | |
|---|---|---|---|
| 7,770,694 B2* | 8/2010 | Baars | F04B 39/0066 |
| | | | 181/229 |
| 10,590,758 B2* | 3/2020 | Shampine | G01V 1/44 |
| 2002/0189897 A1* | 12/2002 | Trochon | F16L 55/033 |
| | | | 181/253 |
| 2004/0140149 A1* | 7/2004 | Terpay | B64C 27/001 |
| | | | 181/233 |
| 2005/0194207 A1 | 9/2005 | Nemit, Jr. et al. | |
| 2008/0093162 A1* | 4/2008 | Marocco | F01N 1/02 |
| | | | 181/250 |
| 2010/0175409 A1 | 7/2010 | Ishikawa et al. | |
| 2019/0249580 A1* | 8/2019 | Nguyen Hung | G10K 11/172 |

* cited by examiner

PRESSURE PULSATION TRAPS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Heating, ventilation, and/or air conditioning (HVAC) systems may generally be used in residential and/or commercial structures to provide heating and/or cooling to climate-controlled areas within these structures. Some HVAC systems may comprise a muffler such as a refrigerant line muffler. For example, pressure pulsations may occur in a refrigerant exiting a compressor, and such pressure pulsations may have relatively large amplitudes, which may cause damage to downstream piping components and generate unwanted noise. Pressure pulsations generally propagate as an acoustic wave at the speed of sound. To mitigate pressure pulsations, noise dampeners such as mufflers may be designed based on acoustic principles. For example, pressure pulsations can be estimated based on the equation, $C=\lambda*f$, where C is the speed of sound, $\lambda$ is the acoustic wavelength, and f is the frequency. Using this equation, a refrigerant line muffler may be designed to induce destructive interference between entering and reflected waves within the refrigerant line muffler, and thereby reduce transmitted pressure pulses caused by the compressor passing the refrigerant through the refrigerant circuit of the HVAC system. Another common strategy for reducing pressure pulsations is to pass the fluid through a typically porous media that reduces the amplitude of the pressure wave by absorbing at least some of the wave's energy.

SUMMARY

In some embodiments of the disclosure, a pressure pulsation trap is provided. The pressure pulsation trap includes a channel extending from an inlet to an outlet, and a plurality of branches extending from the channel, each of the branches having different lengths than one another, where the different lengths are configured such that the branches attenuate noise and/or vibration over a range of operating frequencies.

In other embodiments of the disclosure, a heating, ventilation, and/or air conditioning (HVAC) system is provided. The HVAC system includes a compressor comprising a compressor discharge, and a pressure pulsation trap coupled to the compressor discharge. The pressure pulsation trap includes a channel extending from an inlet to an outlet, and a plurality of branches extending from the channel, each of the branches having different lengths than one another, where the different lengths are configured such that the branches attenuate noise and/or vibration over a range of frequencies at which the compressor is configured to operate.

For the purpose of clarity, any one of the embodiments disclosed herein may be combined with any one or more other embodiments disclosed herein to create a new embodiment within the scope of the present disclosure.

BRIEF DESCRIPTION OF THE DRAWINGS

For a more complete understanding of the present disclosure and the advantages thereof, reference is now made to the following brief description, taken in connection with the accompanying drawings and detailed description.

DETAILED DESCRIPTION

Some HVAC systems employ variable speed compressors, which can emit pressure pulses over a wider frequency range than single speed compressors. While pulsation dampening devices such as reflective and absorptive mufflers may be used to attenuate noise at a particular frequency or frequency range, a typical muffler may not be able to effectively attenuate noise over a wide range of operating frequencies of a variable speed compressor. While additional mufflers may be used to attenuate noise over a wider range of operating frequencies, adding more mufflers may not be suitable due to the increased cost and weight. Moreover, pressure pulsations may vary due to changes in ambient conditions, load, pressure, temperature, etc. Such changes can make it challenging to accurately calculate parameters such as the speed of sound and wavelength. Further, variable speed compressors can emit pressure pulses at lower frequencies than single speed compressors, which may be more difficult for reflective and absorptive mufflers to attenuate. Therefore, dampening devices such as mufflers may not be feasible for variable speed compressors. To address these and other concerns, embodiments of the present disclosure provide pressure pulsation traps configured to attenuate pressure pulsations and noise over a broad range of frequencies, but without having to calculate precise speeds of sound or wavelengths.

Figure 1:
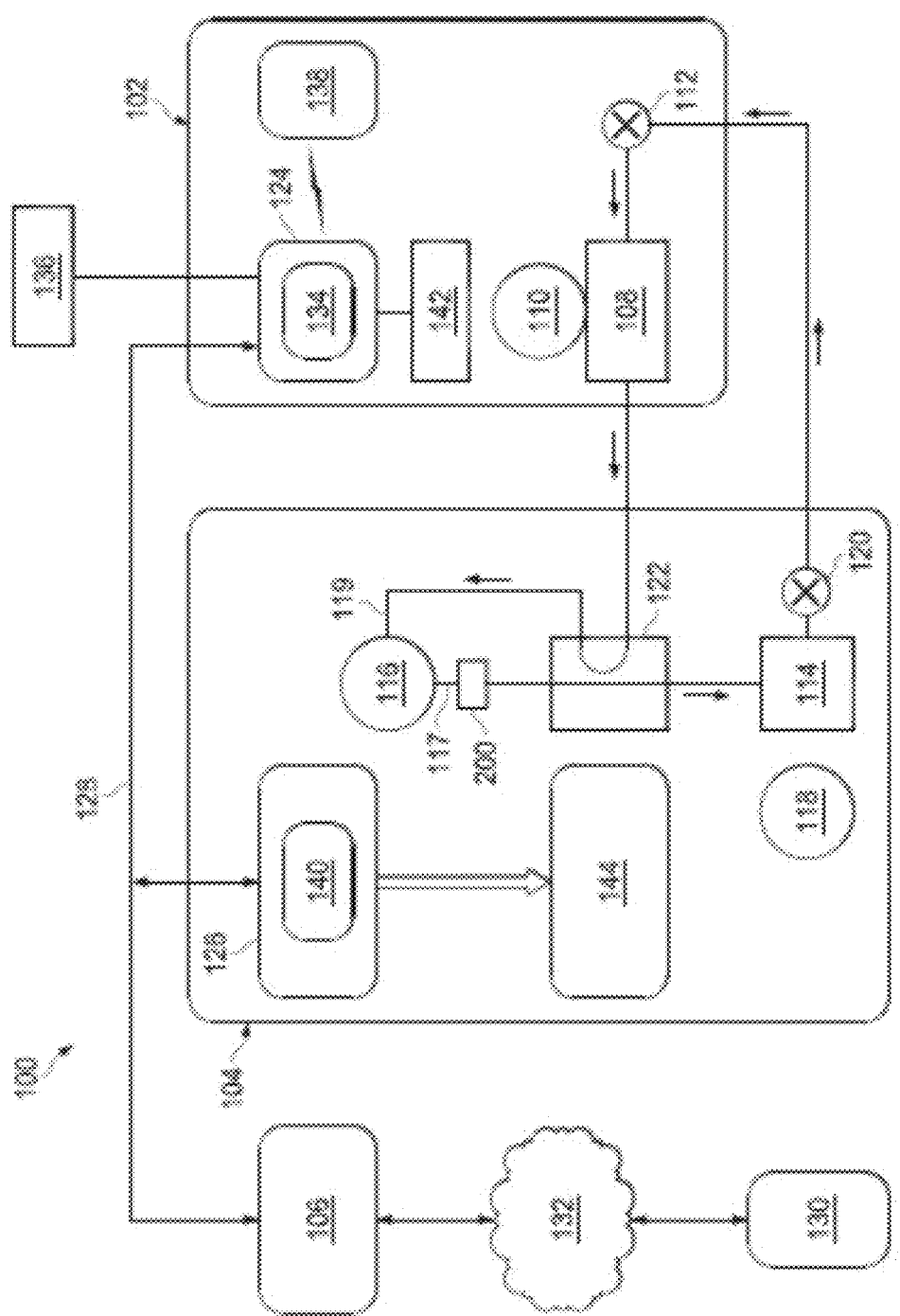
FIG. 1 is a schematic diagram of an HVAC system having a pressure pulsation trap according to an embodiment of the disclosure.

Referring now to FIG. 1, a schematic diagram of an HVAC system 100 is shown according to an embodiment of the disclosure. HVAC system 100 generally comprises an indoor unit 102, an outdoor unit 104, and a system controller 106. The system controller 106 may generally control operation of the indoor unit 102 and/or the outdoor unit 104. As shown, the HVAC system 100 may comprise a so-called heat pump system that may be selectively operated to implement one or more substantially closed thermodynamic refrigeration cycles to provide a cooling functionality and/or a heating functionality.

Indoor unit 102 generally comprises an indoor heat exchanger 108, an indoor fan 110, and an indoor metering device 112. Indoor heat exchanger 108 may comprise a plate fin heat exchanger configured to allow heat exchange between refrigerant carried within internal tubing of the indoor heat exchanger 108 and fluids that contact the indoor heat exchanger 108 but that are kept segregated from the refrigerant. In other embodiments, indoor heat exchanger 108 may comprise a spine fin heat exchanger, a microchannel heat exchanger, or any other suitable type of heat exchanger.

The indoor fan 110 may comprise a centrifugal blower comprising a blower housing, a blower impeller at least partially disposed within the blower housing, and a blower motor configured to selectively rotate the blower impeller. In other embodiments, the indoor fan 110 may comprise a centrifugal, mixed-flow fan and/or any other suitable type of fan. The indoor fan 110 may be configured as a modulating and/or variable speed fan capable of being operated at many speeds over one or more ranges of speeds. In other embodiments, the indoor fan 110 may be configured as a multiple speed fan capable of being operated at a plurality of operating speeds by selectively electrically powering different ones of multiple electromagnetic windings of a motor of the indoor fan 110. In yet other embodiments, the indoor fan 110 may be a single speed fan.

The indoor metering device 112 may comprise an electronically controlled motor driven electronic expansion valve (EEV). In alternative embodiments, the indoor metering device 112 may comprise a thermostatic expansion valve, a capillary tube assembly, and/or any other suitable metering device. The indoor metering device 112 may comprise and/or be associated with a refrigerant check valve and/or refrigerant bypass for use when a direction of refrigerant flow through the indoor metering device 112 is such that the indoor metering device 112 is not intended to meter or otherwise substantially restrict flow of the refrigerant through the indoor metering device 112.

Outdoor unit 104 may generally comprise an outdoor heat exchanger 114, a compressor 116, an outdoor fan 118, an outdoor metering device 120, and a reversing valve 122. In some embodiments, the outdoor unit 104 may also comprise a pressure pulsation trap 200. Outdoor heat exchanger 114 may comprise a microchannel heat exchanger configured to allow heat exchange between refrigerant carried within internal passages of the outdoor heat exchanger 114 and fluids that contact the outdoor heat exchanger 114 but that are kept segregated from the refrigerant. In other embodiments, outdoor heat exchanger 114 may comprise a plate fin heat exchanger, a spine fin heat exchanger, or any other suitable type of heat exchanger.

The compressor 116 generally comprises a compressor discharge 117 where refrigerant may exit the compressor 116 and a compressor inlet 119, where refrigerant may be returned to the compressor 116 after passing through a refrigerant circuit. In some embodiments, the compressor 116 may comprise a multiple speed scroll type compressor configured to selectively pump refrigerant at a plurality of mass flow rates. In alternative embodiments, the compressor 116 may comprise a modulating compressor capable of operation over one or more speed ranges, a reciprocating type compressor, a single speed compressor, and/or any other suitable refrigerant compressor and/or refrigerant pump.

The pressure pulsation trap 200 may generally be installed at and/or near the compressor discharge 117. The pressure pulsation trap 200 may be configured to attenuate specific frequencies of pressure pulses associated with utilizing a variable speed compressor, such as compressor 116, to pump refrigerant through the refrigerant circuit of the HVAC system 100. In other embodiments, the pressure pulsation trap 200 may also be configured to attenuate specific frequencies of pressure pulses associated with utilizing a single speed and/or a multiple-fixed speed compressor. As discussed further below, the pressure pulsation trap 200 may generally be configured to split the flow of refrigerant through multiple branches, each branch being sized so as to trap different wavelengths and frequencies of refrigerant flowing through the pressure pulsation trap 200. Accordingly, the pressure pulsation trap 200 may be configured to reduce noise and/or vibrations emitted by the flowing refrigerant, and thus prevent such noise and/or vibrations from entering the outdoor heat exchanger 114, the indoor unit 102, and/or the refrigerant line leading to a structure that is conditioned by the HVAC system 100.

In some embodiments, the pressure pulsation trap 200 may be positioned at the suction side of the compressor 116 where pressure pulses caused by periodic low pressure pulses emanating from the compressor 116 may present issues. In other embodiments, the pressure pulsation trap 200 may be positioned at a different location. For example, dampening devices such as mufflers may function better or poorer at certain locations. Thus, mathematical models may be used to determine an optical location for a given muffler. By contrast, the pressure pulsation trap 200 may be configured to function substantially the same regardless of position (e.g., as long as the pressure pulsation trap 200 is connected to the compressor discharge 117). Therefore, the pressure pulsation trap 200 may provide greater flexibility than typical dampening devices, as the pressure pulsation trap 200 may be positioned at any desirable location relative to the compressor 116.

Moreover, dampening devices such as mufflers are typically constructed from heavyweight metal such as steel, which may need to be fixed to a different material of the compressor 116 or compressor discharge 117 (e.g., copper). Due to the difference in materials, issues may arise when welding a muffler to the compressor 116 or compressor discharge 117. For example, the muffler may be susceptible to detachment due to the alloy used to weld such pieces together. In an embodiment, the pressure pulsation trap 200 and the compressor discharge 117 may be constructed from substantially similar material (e.g., copper), which may weigh less than steel. As compared to a muffler, the pressure pulsation trap 200 may not only provide better compatibility in terms of welding it to the compressor discharge 117, but it may also be less susceptible to fatigue due to the lighter weight material(s) used to construct the pressure pulsation trap 200.

The outdoor fan 118 may comprise an axial fan having a fan blade assembly and fan motor configured to selectively rotate the fan blade assembly. In other embodiments, the outdoor fan 118 may comprise a mixed-flow fan, a centrifugal blower, and/or any other suitable type of fan and/or blower. The outdoor fan 118 may be configured as a modulating and/or variable speed fan capable of being operated at many speeds over one or more ranges of speeds. In other embodiments, the outdoor fan 118 may be configured as a multiple speed fan capable of being operated at a plurality of operating speeds by selectively electrically powering different ones of multiple electromagnetic windings of a motor of the outdoor fan 118. In yet other embodiments, the outdoor fan 118 may be a single speed fan.

The outdoor metering device 120 may comprise a thermostatic expansion valve. In alternative embodiments, the outdoor metering device 120 may comprise an electronically controlled motor driven EEV similar to indoor metering device 112, a capillary tube assembly, and/or any other suitable metering device. The outdoor metering device 120 may comprise and/or be associated with a refrigerant check valve and/or refrigerant bypass for use when a direction of refrigerant flow through the outdoor metering device 120 is such that the outdoor metering device 120 is not intended to meter or otherwise substantially restrict flow of the refrigerant through the outdoor metering device 120.

The reversing valve 122 may comprise a so-called four-way reversing valve, which may be selectively controlled to alter a flow path of refrigerant in the HVAC system 100 as described in greater detail below. The reversing valve 122 may comprise an electrical solenoid or other device configured to selectively move a component of the reversing valve 122 between operational positions.

The system controller 106 may generally comprise an input/output (I/O) unit (e.g., a touchscreen interface) for displaying information and for receiving user inputs. he system controller 106 may display information related to the operation of the HVAC system 100 and may receive user inputs related to operation of the HVAC system 100. However, the system controller 106 may further be operable to display information and receive user inputs tangentially and/or unrelated to operation of the HVAC system 100. In some embodiments, the system controller 106 may not comprise a display and may derive all information from inputs from remote sensors and remote configuration tools. In some embodiments, the system controller 106 may comprise a temperature sensor and may further be configured to control heating and/or cooling of zones associated with the HVAC system 100. In some embodiments, the system controller 106 may be configured as a thermostat for controlling supply of conditioned air to zones associated with the HVAC system 100.

In some embodiments, the system controller 106 may also selectively communicate with an indoor controller 124 of the indoor unit 102, with an outdoor controller 126 of the outdoor unit 104, and/or with other components of the HVAC system 100. In some embodiments, the system controller 106 may be configured for selective bidirectional communication over a communication bus 128. In some embodiments, portions of the communication bus 128 may comprise a three-wire connection suitable for communicating messages between the system controller 106 and one or more of the HVAC system 100 components configured for interfacing with the communication bus 128. Still further, the system controller 106 may be configured to selectively communicate with HVAC system 100 components and/or any other device 130 via a communication network 132. In some embodiments, the communication network 132 may comprise a telephone network, and the other device 130 may comprise a telephone. In some embodiments, the communication network 132 may comprise the Internet, and the other device 130 may comprise a smartphone and/or other Internet-enabled mobile telecommunication device. In other embodiments, the communication network 132 may also comprise a remote server.

The indoor controller 124 may be carried by the indoor unit 102 and may be configured to receive information inputs, transmit information outputs, and otherwise communicate with the system controller 106, the outdoor controller 126, and/or any other device 130 via the communication bus 128 and/or any other suitable medium of communication. In some embodiments, the indoor controller 124 may be configured to communicate with an indoor personality module 134 that may comprise information related to the identification and/or operation of the indoor unit 102. In some embodiments, the indoor controller 124 may be configured to receive information related to a speed of the indoor fan 110, transmit a control output to an electric heat relay, transmit information regarding an indoor fan 110 volumetric flow-rate, communicate with and/or otherwise affect control over an air cleaner 136, and communicate with an indoor EEV controller 138. In some embodiments, the indoor controller 124 may be configured to communicate with an indoor fan controller 142 and/or otherwise affect control over operation of the indoor fan 110. In some embodiments, the indoor personality module 134 may comprise information related to the identification and/or operation of the indoor unit 102 and/or a position of the outdoor metering device 120.

In some embodiments, the indoor EEV controller 138 may be configured to receive information regarding temperatures and/or pressures of the refrigerant in the indoor unit 102. More specifically, the indoor EEV controller 138 may be configured to receive information regarding temperatures and pressures of refrigerant entering, exiting, and/or within the indoor heat exchanger 108. Further, the indoor EEV controller 138 may be configured to communicate with the indoor metering device 112 and/or otherwise affect control over the indoor metering device 112. The indoor EEV controller 138 may also be configured to communicate with the outdoor metering device 120 and/or otherwise affect control over the outdoor metering device 120.

The outdoor controller 126 may be carried by the outdoor unit 104 and may be configured to receive information inputs, transmit information outputs, and otherwise communicate with the system controller 106, the indoor controller 124, and/or any other device 130 via the communication bus 128 and/or any other suitable medium of communication. In some embodiments, the outdoor controller 126 may be configured to communicate with an outdoor personality module 140 that may comprise information related to the identification and/or operation of the outdoor unit 104. In some embodiments, the outdoor controller 126 may be configured to receive information related to an ambient temperature associated with the outdoor unit 104, information related to a temperature of the outdoor heat exchanger 114, and/or information related to refrigerant temperatures and/or pressures of refrigerant entering, exiting, and/or within the outdoor heat exchanger 114 and/or the compressor 116. In some embodiments, the outdoor controller 126 may be configured to transmit information related to monitoring, communicating with, and/or otherwise affecting control over the outdoor fan 118, a compressor sump heater, a solenoid of the reversing valve 122, a relay associated with adjusting and/or monitoring a refrigerant charge of the HVAC system 100, a position of the indoor metering device 112, and/or a position of the outdoor metering device 120. The outdoor controller 126 may further be configured to communicate with a compressor drive controller 144 that is configured to electrically power and/or control the compressor 116.

The HVAC system 100 may be configured for operating in a so-called cooling mode in which heat is absorbed by refrigerant at the indoor heat exchanger 108 and heat is rejected from the refrigerant at the outdoor heat exchanger 114. In some embodiments, the compressor 116 may be operated to compress refrigerant and pump the relatively high temperature and high pressure compressed refrigerant from the compressor 116 through the pressure pulsation trap 200, through the reversing valve 122, and to the outdoor heat exchanger 114. As the refrigerant is passed through the outdoor heat exchanger 114, the outdoor fan 118 may be operated to move air into contact with the outdoor heat exchanger 114, thereby transferring heat from the refrigerant to the air surrounding the outdoor heat exchanger 114. The refrigerant leaving the outdoor heat exchanger 114 may primarily comprise liquid phase refrigerant, and the refrigerant may flow from the outdoor heat exchanger 114 to the indoor metering device 112 through and/or around the outdoor metering device 120 which does not substantially impede flow of the refrigerant in the cooling mode. The indoor metering device 112 may meter passage of the refrigerant through the indoor metering device 112 so that the refrigerant downstream of the indoor metering device 112 is at a lower pressure than the refrigerant upstream of the indoor metering device 112. The pressure differential across the indoor metering device 112 allows the refrigerant downstream of the indoor metering device 112 to expand and/or at least partially convert to a two-phase (vapor and gas) mixture. The two-phase refrigerant may enter the indoor heat exchanger 108. As the refrigerant is passed through the indoor heat exchanger 108, the indoor fan 110 may be operated to move air into contact with the indoor heat exchanger 108, thereby transferring heat to the refrigerant from the air surrounding the indoor heat exchanger 108, and causing evaporation of the liquid portion of the two-phase mixture. The vapor-phase refrigerant may thereafter re-enter the compressor 116 after passing through the reversing valve 122.

To operate the HVAC system 100 in the so-called heating mode, the reversing valve 122 may be controlled to alter the flow path of the refrigerant, the indoor metering device 112 may be disabled and/or bypassed, and the outdoor metering device 120 may be enabled. In the heating mode, refrigerant may flow from the compressor 116 to the indoor heat exchanger 108 through the reversing valve 122, the refrigerant may be substantially unaffected by the indoor metering device 112, the refrigerant may experience a pressure differential across the outdoor metering device 120, the refrigerant may pass through the outdoor heat exchanger 114, and the refrigerant may re-enter the compressor 116 after passing through the reversing valve 122. Most generally, operation of the HVAC system 100 in the heating mode reverses the roles of the indoor heat exchanger 108 and the outdoor heat exchanger 114 as compared to their operation in the cooling mode.

Figure 2:
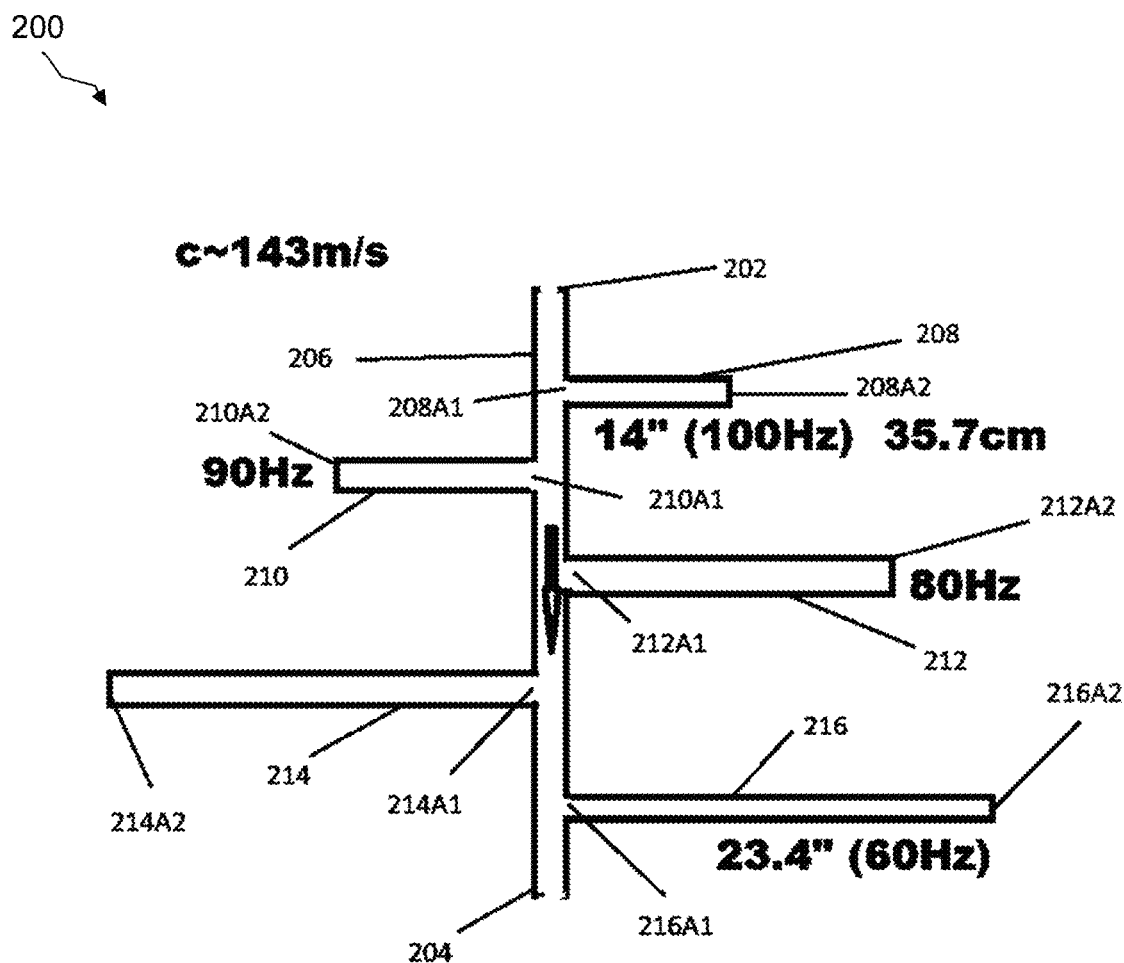
FIG. 2 is an enlarged view of the pressure pulsation trap of FIG. 1.

Referring now to FIG. 2, an enlarged view of the pressure pulsation trap 200 of FIG. 1 is shown according to an embodiment of the disclosure. The pressure pulsation trap 200 comprises an inlet 202, an outlet 204, a central channel 206, and a plurality of branches 208, 210, 212, 214, and 216. The central channel 206 may generally comprise a hollow tubular body, which defines an internal flow path configured to communicate with a plurality of flow paths defined by the plurality of branches 208-216, respectively. For example, each branch 208-216 may generally be shaped to define a substantially straight, linear flow path extending between an open end 208A1, 210A1, 212A1, 214A1, and 216A1 and a closed end 208A2, 210A2, 212A2, 214A2, and 216A2, respectively. However, in other embodiments, one or more of the branches 208, 210, 210, 214, and/or 216 may define any other shaped flow path.

While five branches 208-216 are depicted in FIG. 2, the pressure pulsation trap 200 may comprise more or less branches, e.g., depending upon one or more particular frequencies to be attenuated. Likewise, it is to be understood that any pressure pulsation trap disclosed herein may comprise more or less branches in other embodiments. Further, while the plurality of branches 208-216 may generally be tubular, it is to be understood that the any of the branches disclosed herein may comprise any suitable size and/or shape.

In general, the pressure pulsation trap 200 is configured to attenuate a range of frequencies of pressure pulses associated with utilizing a variable speed compressor, such as compressor 116 of FIG. 1, to pump refrigerant through the refrigerant circuit of the HVAC system 100 of FIG. 1. However, as the pressure pulsation trap 200 is designed to minimize transmission of a single wavelength and its odd-integer multiples, it is applicable to a variety of compressor types including single-speed, multiple-fixed-speed, and/or variable speed compressor types. The pressure pulsation trap 200 may generally be formed from copper tubing. However, in alternative embodiments, the pressure pulsation trap 200 may be formed from any other material capable of carrying refrigerant through the central channel 206 and branches 208-216 of the pressure pulsation trap 200. Furthermore, it will be appreciated that the central channel 206 and branches 208-216 may comprise substantially similar diameter tubing in some embodiments. However, in alternative embodiments, the central channel 206 and/or branches 208-216 may comprise different diameters.

The central channel 206 of the pressure pulsation trap 200 may receive refrigerant from the compressor discharge 117 of compressor 116 through the inlet 202. The central channel 206 may branch into the plurality of branches 208-216 to split the flow of refrigerant through the pressure pulsation trap 200. Refrigerant may travel through the central channel 206 and into each of the branches 208-216 and exit the pressure pulsation trap 200 through the outlet 204. Soundwaves carried by refrigerant may travel into the branches 208-216 via respective open ends 208A1-216A1, reflect at respective closed ends 208A2-216A2, and travel back out of the branches 208-216.

The plurality of branches 208-216 may generally comprise different lengths than one another. In some embodiments such as shown in FIG. 2, the lengths of the branches 208-216 may gradually increase as the pressure pulsation trap 200 extends from the inlet 202 to the outlet 204. In other embodiments, the lengths of the branches 208-216 may gradually decrease as the pressure pulsation trap 200 extends from the inlet 202 to the outlet 204. In yet other embodiments, the branches 208-216 may be arranged without regard to whether their lengths gradually increase or decrease from the inlet 202 to the outlet 204 (e.g., branch 208 may be disposed between branch 216 and branch 214).

In general, the length of the branches 208-216 may be determined by the wavelength of the pressure pulses that the pressure pulsation trap 200 is configured to attenuate. More particularly, the length of the branches 208-216 may be based on acoustic principles, which predict that standing waves associated with acoustical resonances in the compressor discharge 117 will generate at certain lengths (or distances). Because each branch 208-216 comprises an open end 208-A1-216A1 and a closed end 208A2-216A2, each branch 208-216 will generate resonant standing waves at a fundamental frequency and at odd harmonics. For example, because waves travelling through the branches 208-216 will change phase upon reflecting from the closed ends 208A2-216A2, standing waves may be predicted to occur when the reflected waves interference with incident waves travelling through the branches 208-216.

Wavelength may generally be derived from the equation, $\lambda=c/f$, where $\lambda$ denotes wavelength, f denotes frequency, and c denotes speed, which is a constant that may be obtained from industry charts, e.g., the speed of sound in air is about 344 meters per second (m/s). Further, in the case of open-closed tubes such as branches 208-216, frequency may be derived from the following equation:

$$f=(n*v)/(4*L), \text{ where} \tag{1}$$

f denotes frequency in Hertz (Hz), n denotes an odd integer (1, 3, 5, 7, ...), v denotes wave speed in m/s, and L denotes length of branch in meters.

FIG. 2 depicts an example in which the speed of sound in refrigerant flowing through the pressure pulsation trap 200 is about 143 m/s. In this example, the wavelength of a 100 hertz (Hz) wave is about 56.3 inches (in); the wavelength of a 90 Hz wave is about 62.5 in.; the wavelength of an 80 Hz wave is about 70.3 in.; the wavelength of a 70 Hz wave is about 80.3 in.; and the wavelength of a 60 Hz wave is about 93.7 in. It is to be understood that in other examples, the speed of sound may vary based on one or more factors, e.g., the type of refrigerant flowing through the pressure pulsation trap 200.

In an embodiment, the branches 208-216 may be sized according to the quarter wavelength acoustic principle. Thus, the lengths of branches 208, 210, 212, 214, and 216 may be about 14 in., 15.6 in., 17.6 in., 20 in., and 23.4 in., respectively. By sizing each of the branches 208-216 to about one-quarter (¼) of the wavelengths of the pressure pulses sought to be attenuated, the waves of the pressure pulses travelling into and back out of the branches 208, 210, 212, 214, and 216 are phase-shifted (e.g., by about 180 degrees) so as to "trap" not only a standing wave of a base frequency that is generated within each respective branch 208, 210, 212, 214, and 216, but also standing waves having frequencies that are integer multiples of the base frequency (i.e., frequencies where n is an odd integer). For example, it can be seen from equation (1) that branch 208 may trap a standing wave having a base frequency of about 100 Hz (i.e., n=1). However, it can also be seen that branch 208 may trap standing waves having higher order frequencies of about 300 Hz (i.e., n=3), 500 Hz (i.e., n=5), etc. In other words, each branch 208, 210, 212, 214, and 216 may trap multiple standing waves having different wavelengths than one another, thereby reducing noise and/or vibrations emitted by refrigerant flowing out of the pressure pulsation trap 200. Accordingly, the pressure pulsation trap 200 may eliminate or reduce pressure pulsations over a broad range of operating frequencies. In other embodiments, the pressure pulsation trap 200 may comprise branches 208-216 having lengths that are substantially one-half of the wavelengths sought to be attenuated.

In some embodiments, the pressure pulsation trap 200 may be generally configured for use in an HVAC system comprising a variable speed compressor. Because variable speed compressors generally produce pressure pulses having a larger range of frequencies and/or lower frequencies that are difficult to attenuate as compared to single speed compressors, the pressure pulsation trap 200 is configured to attenuate such low frequencies and/or a very large range of frequencies as compared to conventional mufflers designed for operation in single speed HVAC systems. For example, the pressure pulsation trap 200 may be configured to attenuate frequencies as low as about 20 Hz while providing a substantially low pressure drop across the pressure pulsation trap 200. Additionally, the use of tubular branches 208-216 may provide a compact size for the pressure pulsation trap 200.

In other embodiments, the pressure pulsation trap 200 may be generally configured for use in an HVAC system comprising a fixed speed compressor. In such embodiments, the pressure pulsation trap 200 may be configured to attenuate noise at a particular wavelength associated with an operating speed of the fixed speed compressor. Because only a particular wavelength may be of interest in such embodiments, the plurality of traps 208-216 may be equally sized to attenuate that particular wavelength and any harmonics thereof. If desired (e.g., to further reduce pressure pulsations), the number of branches 208-216 may be increased to trap additional waves.

Figure 3:
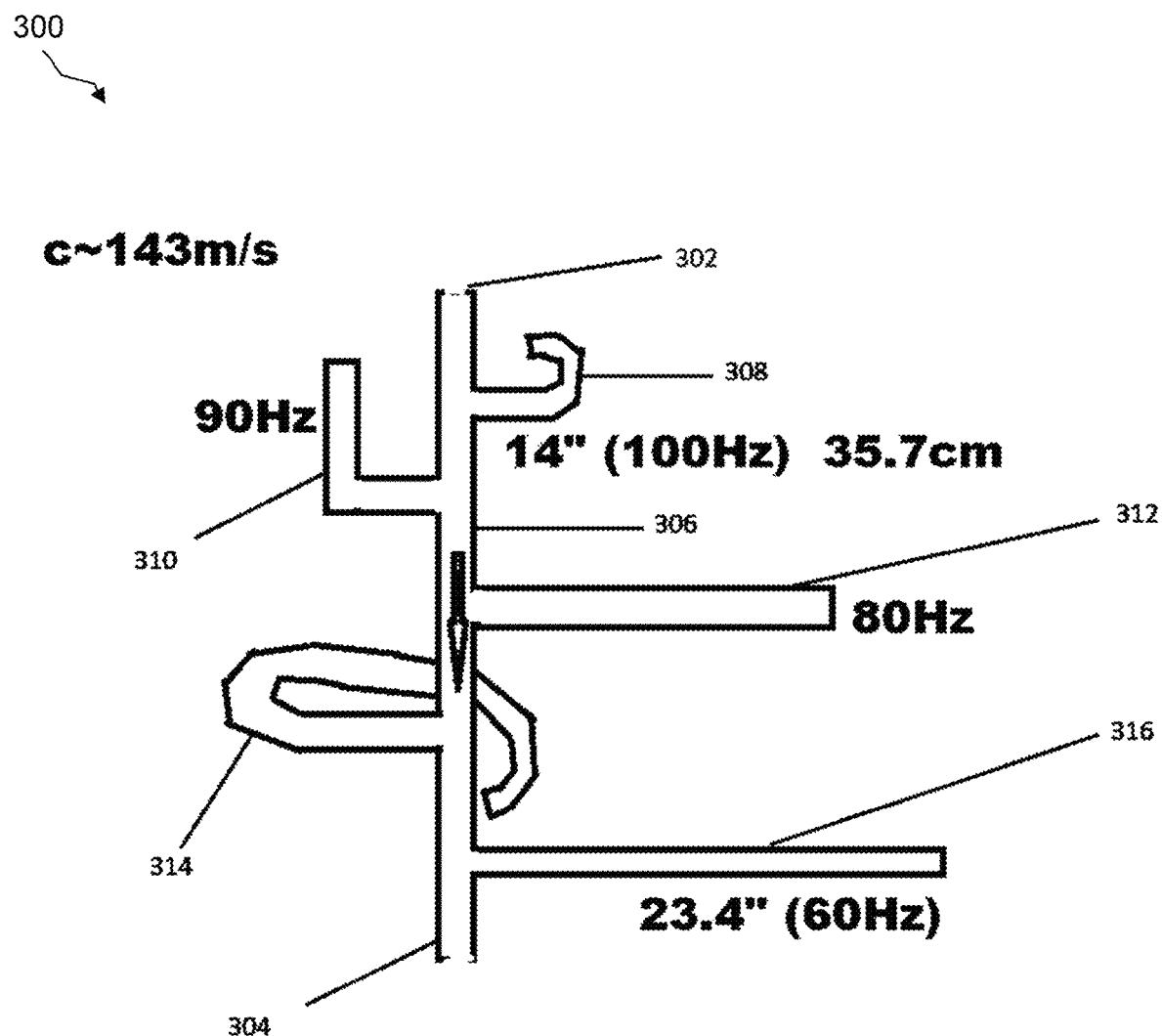
FIG. 3 is an enlarged view of a pressure pulsation trap according to an embodiment of the disclosure.

Referring now to FIG. 3, an enlarged view of a pressure pulsation trap 300 is shown according to an embodiment of the disclosure. Like pressure pulsation trap 200, the pressure pulsation trap 300 comprises an inlet 302, an outlet 304, a central channel 306, and a plurality of branches 308, 310, 312, 314, and 316. The branches 308-316 comprise substantially similar lengths and diameters as branches 208-216. However, the shape of one or more of the branches 308, 310, 312, 314, and/or 316 may be modified such that the pressure pulsation trap 300 occupies less space. For example, branches 308 and 314 may be curved, while branch 310 may be bent as shown in FIG. 3. In other examples, branches 312 and/or 316 may also be bent or curved (e.g., to further minimize space occupied by the pressure pulsation trap 300). For example, to accommodate longer lengths, branch 312 and/or branch 316 may be shaped into at least one coil such as branch 314.

Figure 4:
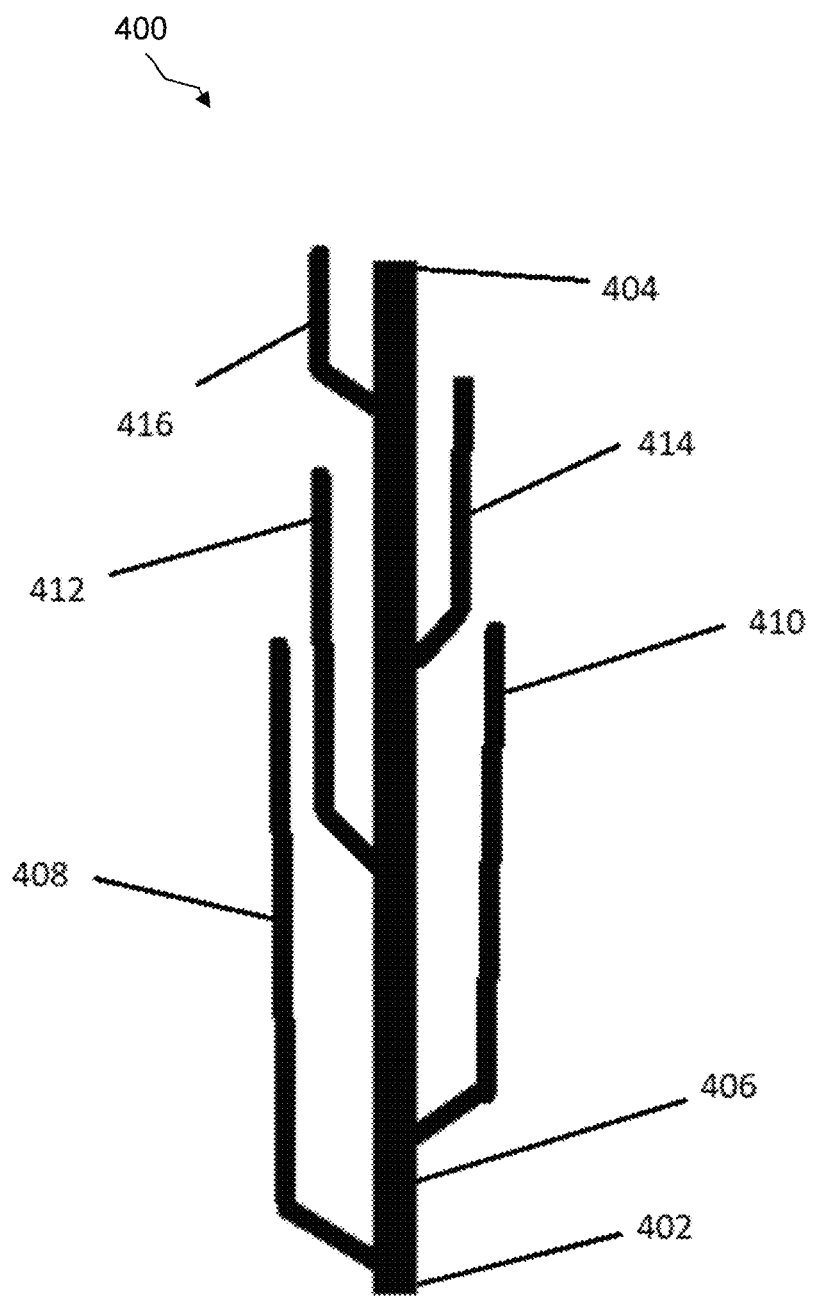
FIG. 4 is enlarged view of a pressure pulsation trap according to an embodiment of the disclosure.

Referring now to FIG. 4, an enlarged view of a pressure pulsation trap 400 is shown according to an embodiment of the disclosure. In this embodiment, the pressure pulsation trap 400 is positioned vertically, but it is to be understood that the pressure pulsation trap 400 may be positioned accordingly to any suitable orientation in other embodiments. Like pressure pulsation traps 200 and 300, the pressure pulsation trap 400 comprises an inlet 402, an outlet 404, a central channel 406, and a plurality of branches 408, 410, 412, 414, and 416. The pressure pulsation trap 400 generally operates in substantially the same manner as pressure pulsation traps 200 and 300. Briefly, for example, the branches 408-416 may be sized based on a respective wavelength of pressure pulsations such that the pressure pulsation trap 400 effectively attenuates noise and/or vibrations over a desired range of frequencies.

As shown in FIG. 4, the pressure pulsation trap 400 may comprise a cactus-like shape, which may be achieved by bending or curving each of the branches 408-416, thus reducing the overall dimension of the pressure pulsation trap 400. While the branches 408-416 are shown as being bent or curved at obtuse angles, it is to be understood that the branches 408-416 may be bent or curved at any suitable angle in other embodiments. Designing the branches 408-414 with bends or curves as shown may be useful in applications where lubricant such as oil is employed to lubricate the compressor 116. In particular, the bends or curves in such applications may allow oil entering the pressure pulsation trap 400 with refrigerant to flow back down to the inlet 402 (e.g., through the force of gravity) and return to the compressor 116. By comparison, it may be more challenging for oil to flow back down the pressure pulsation trap 200 of FIG. 2 due to the linear shape of the branches 208-216. Further, while the branches 408-416 are shown as being bent or curved at obtuse angles, it is to be understood that the branches 408-416 may be bent or curved at other angles in other embodiments. More generally, the branches 408-416 may be oriented in any manner suited to facilitate a downward flow of oil or otherwise ensure that oil is not retained in the pressure pulsation trap 400.

Figure 5:
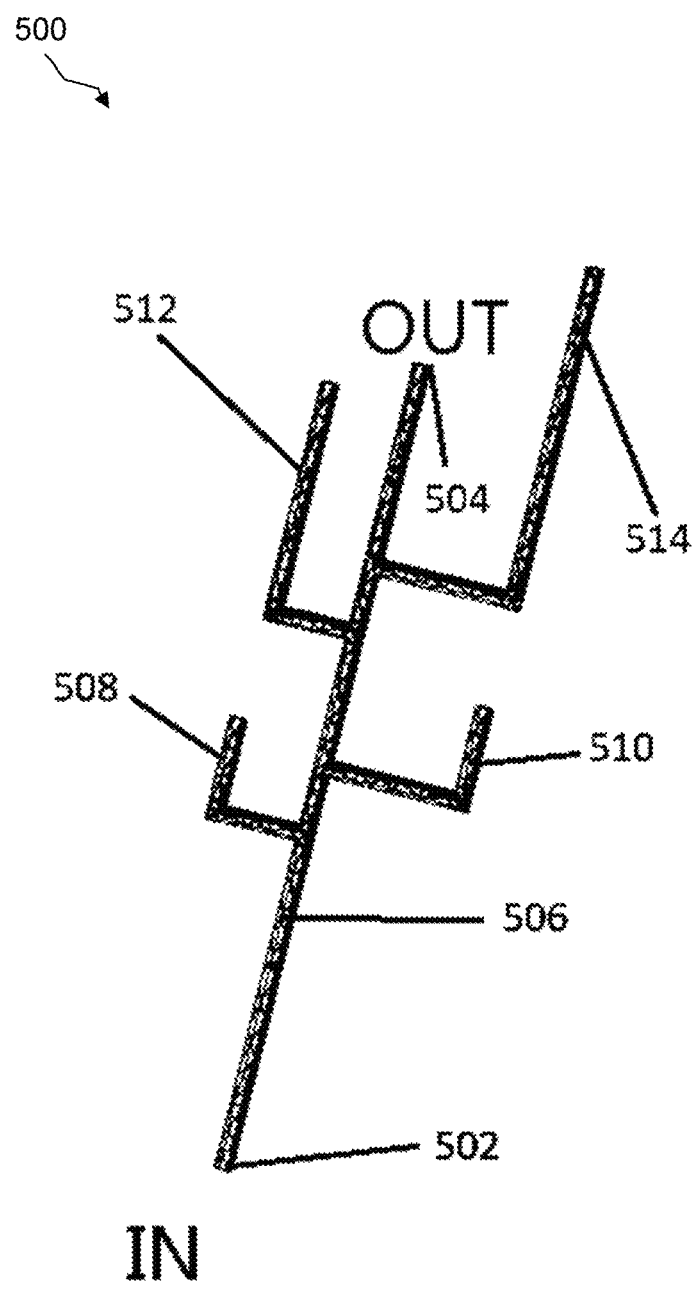
FIG. 5 is an enlarged view of a pressure pulsation trap according to an embodiment of the disclosure.

Referring now to FIG. 5, an enlarged view of a pressure pulsation trap 500 is shown according to an embodiment of the disclosure. Pressure pulsation trap 500 may generally be substantially similar to pressure pulsation trap 400 and comprise an inlet 502, outlet 504, a central channel 506, and a plurality of branches 508, 510, 512, and 514. While pressure pulsation trap 500 is shown as having one less branch than pressure pulsation trap 400, it is to be understood that both traps 400 and 500 may comprise any suitable number of branches. Further, the pressure pulsation trap 500 may comprise branches 508-514 bent or curved at a substantially right angle rather than at a substantially obtuse angle as shown in FIG. 4.

Figure 6:
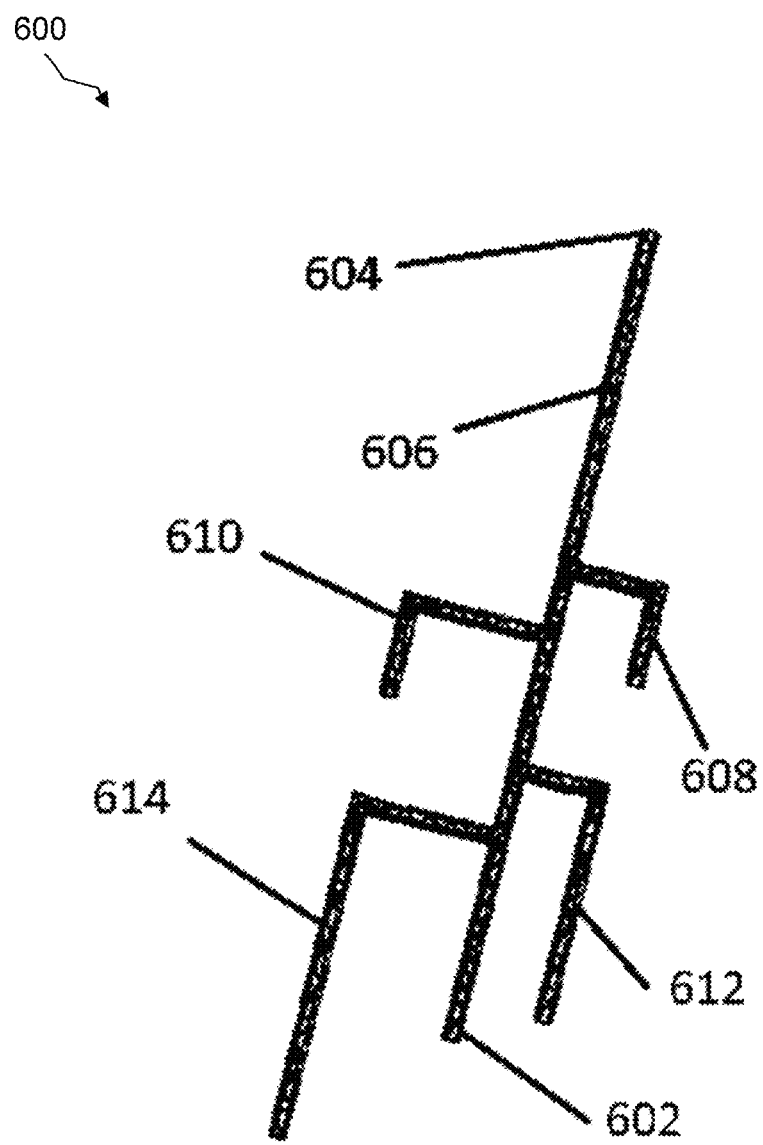
FIG. 6 is an enlarged view of a pressure pulsation trap according to another embodiment of the disclosure.

Referring now to FIG. 6, an enlarged view of a pressure pulsation trap 600 is shown according to an embodiment of the disclosure. The pressure pulsation trap 600 represents an inverted version of the pressure pulsation trap 500 shown in FIG. 5. Thus, the pressure pulsation trap 600 may otherwise be substantially similar to pressure pulsation trap 500 and comprise an inlet 602, an outlet 604, a central channel 606, and a plurality of branches 608, 610, 612, and 614. In some embodiments, one or more of the branches 608, 610, 612, and/or 614 may be bent or curved at a different angle than shown in FIG. 6.

Figure 7:
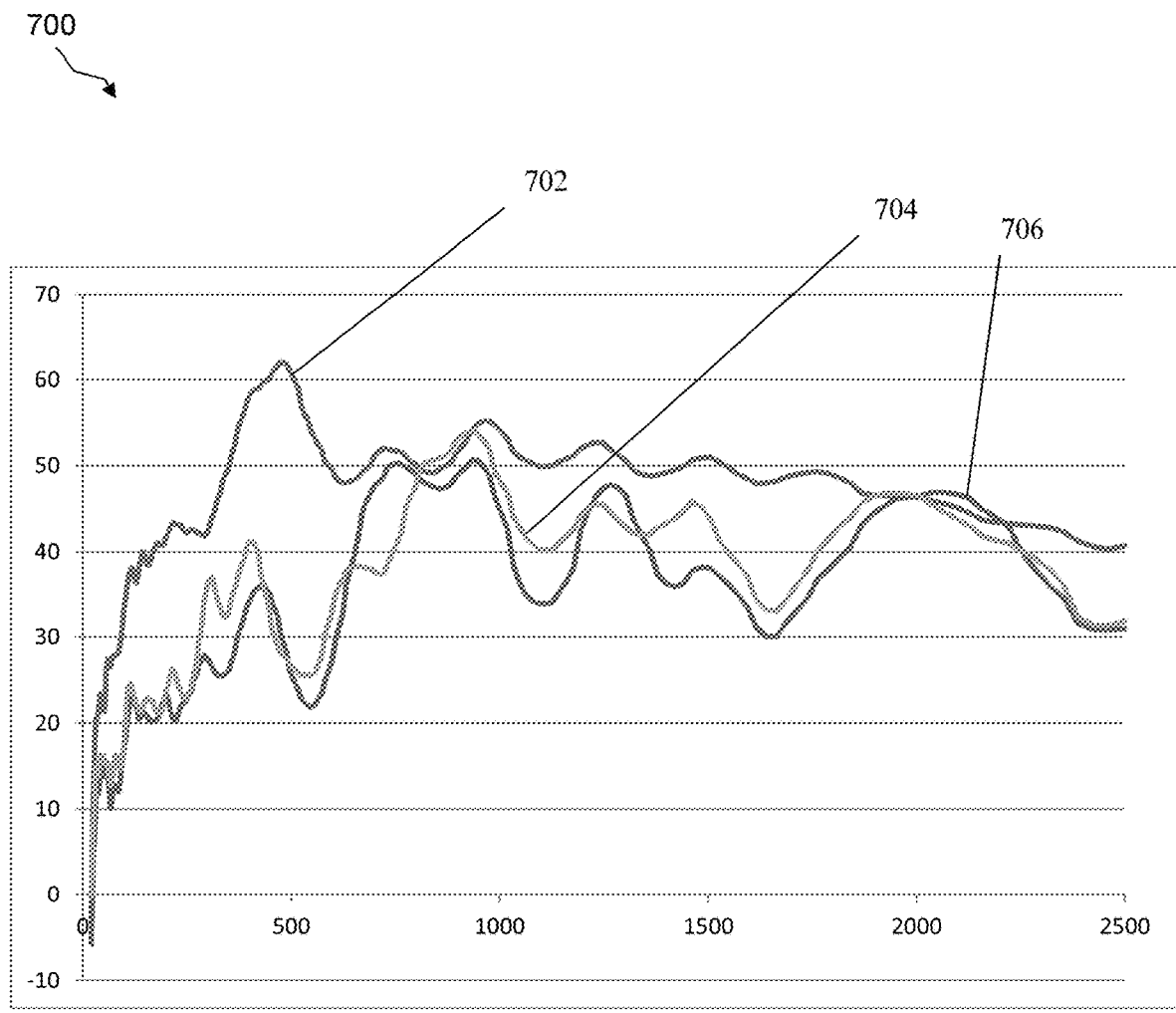
FIG. 7 is a chart showing attenuation performance of a linear pressure pulsation trap versus pressure pulsation traps according to embodiments of the disclosure.

Referring now to FIG. 7, a chart 700 is shown comparing the sound attenuation performance of a linear pressure pulsation trap and the pressure pulsation traps 500 and 600 of FIGS. 5 and 6, respectively. The linear pressure pulsation trap corresponds to the pressure pulsation trap 500 shown in FIG. 5, but without the plurality of branches 508-514. Thus, the linear pressure pulsation trap comprises an inlet, outlet, and central channel substantially similar to the inlet 502, outlet 504, and central channel 506, respectively.

The chart 700 depicts frequency in Hz along the x-axis and sound attenuation in decibels (dB) along the y-axis. Lines 702, 704, and 706 denote wave spectrums based on a simulation using pink noise ranging over an operating frequency of 20 Hz to 20 kilohertz (Khz) as an input to the linear pressure pulsation trap and pressure pulsation traps 500, 600. Specifically, line 702 denotes a waveform corresponding to an output measured at the outlet of the linear pressure pulsation trap; line 704 denotes a waveform corresponding to an output measured at the outlet 504 of the pressure pulsation trap 500 shown in FIG. 5; and line 706 denotes a wave spectrum corresponding to an output measured at the outlet 604 shown in FIG. 6.

It is apparent from lines 704 and 706 that pressure pulsation traps having branches such as shown in FIGS. 5 and 6 may achieve greater sound attenuation at frequencies up to about 20 Khz, as compared to the linear pressure pulsation trap without such branches. Further, simulations as discussed above have demonstrated that transmission loss may be reduced by about 15 dB when using pressure pulsation traps having branches such as disclosed herein.

In some embodiments, one or more of the pressure pulsation traps 200, 300, 400, 500, and/or 600 disclosed herein may comprise tubing of a different diameter than that of the compressor discharge 117. For example, similar results may be achieved so long as the respective branches are sized to tune the pressure pulsation frequencies of interest.

In some embodiments, one or more of the pressure pulsation traps 200, 300, 400, 500, and/or 600 disclosed herein may comprise adjustable branches. For example, an HVAC system typically has inherent frequencies where amplifications or vibrations may occur at a certain frequency due to the mechanical design of equipment in the HVAC system. Moreover, certain frequencies may be amplified under certain conditions, which may not be observed until after installing the pressure pulsation trap 200, 300, 400, 500, or 600 in the HVAC system. Further, the presence of noise and/or vibrations may vary based upon the medium discharged from the compressor 116

Thus, while the branches of the pressure pulsation traps disclosed herein may initially be sized to attenuate noise and/or vibrations at operating frequencies deemed to be most problematic, some refinements may be needed for proper attenuation at other operating frequencies or in different conditions (e.g., due to changes in refrigerant, temperature, etc.). To make such refinements, the pressure pulsation trap(s) 200, 300, 400, 500, and/or 600 may comprise adjustable end caps at distal ends of their respective branches (e.g., at ends 208A2-216A2 in FIG. 2). For example, the adjustable end caps may include flexible portions configured to adjust the length of the branches. Such adjustments may be made in a manner similar to that of accordions or trombones. Alternatively, the pressure pulsation trap(s) 200, 300, 400, 500, and/or 600 may comprise other mechanisms to adjust branch lengths.

In some embodiments, the pressure pulsation trap(s) 200, 300, 400, 500, and/or 600 may comprise branches having lengths that are one-quarter of the wavelength(s) sought to be attenuated. In other embodiments, the pressure pulsation trap(s) 200, 300, 400, 500, and/or 600 may comprise branches having different lengths, e.g., lengths that are one-half of the wavelength(s) sought to be attenuated. In some embodiments, the length of at least one branch of the pressure pulsation trap(s) 200, 300, 400, 500, and/or 600 may be increased to trap additional waves.

In some embodiments, the pressure pulsation trap(s) 200, 300, 400, 500, and/or 600 may be used in an HVAC system such as a heat pump system and/or an air-conditioning system. In some embodiments, the pressure pulsation trap(s) 200, 300, 400, 500, and/or 600 may be used in residential systems and/or commercial systems. In some embodiments, the pressure pulsation trap(s) 200, 300, 400, 500, and/or 600 may be used for any applications desired to attenuate noise and/or vibrations, e.g., in stadiums, malls, schools, gymnasiums, skyscrapers, etc.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Unless otherwise stated, the term "about" shall mean plus or minus 10 percent of the subsequent value. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

What is claimed is:

1. A heating, ventilation, and/or air conditioning (HVAC) system, comprising:
    a compressor that compresses a fluid comprising a refrigerant and a lubricant, wherein the compressor comprises a compressor discharge of a mixed fluid comprising refrigerant and lubricant; and
    a pressure pulsation trap coupled to the compressor discharge that receives the mixed fluid, the pressure pulsation trap comprising:
    a channel extending from an inlet to an outlet; and
    a plurality of branches extending from the channel, each of the branches comprising: a first, open end; a fixed, closed end; and a rigid wall extending from the first, open end to the fixed, closed end, wherein the rigid wall defines a length for each branch, and the inner surface of the rigid wall defines an inner diameter for each branch;
    wherein each branch has a different length than one another,
    wherein the first, open end is in fluid communication with the channel and has the same inner diameter as the inner diameter of the rigid wall;
    wherein the rigid wall has the same inner diameter from the first, open end to the fixed, closed end,
    wherein the different lengths equal ¼ or ½ of different wavelengths of pressure pulsations to be attenuated within a range of frequencies at which the compressor is configured to operate, and
    wherein the channel is arranged substantially vertically, and the plurality of branches extend away from the channel in a direction that is both horizontal and vertical for at least a portion of the branch length such that lubricant from the plurality of branches returns to the channel and to the inlet under the force of gravity.

2. The HVAC system of claim 1, wherein each branch selected from the plurality of branches is configured to attenuate a pressure pulsation within the range of operating frequencies by trapping a standing wave having a base frequency and at least one other standing wave having a higher frequency that is an integer-multiple of the base frequency, and
    wherein the base frequency and the higher frequency of the standing wave and the at least one other standing wave, respectively, is derived from an equation as follows:

$$f=(n*v)/(4*L), \text{ where} \tag{1}$$

f is the base frequency or the higher frequency, n is an odd integer, v is wave speed, and L is branch length.

3. The HVAC system of claim 1, wherein the plurality of branches are tubular, and wherein at least one branch selected from the plurality of branches comprises a bend or curve.

4. The HVAC system of claim 1, wherein at least one branch selected from the plurality of branches comprises coils extending at least partially around the channel.

5. The HVAC system of claim 1, wherein each of the plurality of branches extend from the channel such that the pressure pulsation trap comprises a cactus-shaped orientation.

6. The HVAC system of claim 3, wherein the bend or curve is such that the at least one branch defines a first flow path this that is substantially perpendicular to the channel and a second flow path that is substantially parallel to the channel.

7. The HVAC system of claim 1, wherein the plurality of branches extend from a plurality of sides of the channel, and wherein each of the plurality of branches comprises:
    a bend;
    a first portion extending from the opening to the bend; and
    a second portion extending from the bend to the fixed, closed end,
    wherein the first portion extends substantially perpendicularly to the channel; and
    wherein the second portion extends substantially parallel with the channel.

8. The HVAC system of claim 7, wherein each of the plurality of branches is oriented such that the fixed, closed end is projected toward the outlet of the channel from the bend.

9. The HVAC system of claim 8, wherein an inner diameter of the channel is substantially the same as the inner diameter of each of the plurality of branches.

10. The HVAC system of claim 1, wherein an inner diameter of the channel is substantially the same as the inner diameter of each of the plurality of branches.

11. The HVAC system of claim 1, wherein the rigid wall for each branch rigidly fixes the distance between the open, first end and the fixed, closed end for that branch.

12. The HVAC system for claim 1, wherein each branch is substantially hollow.

13. The HVAC system of claim 1, wherein the different lengths are such that the length for the longest branch is not an integer multiple of another shorter branch length.

14. The HVAC system of claim 2, wherein the base frequency for at least one branch corresponds to an operating frequency of the compressor.

15. The HVAC system of claim 14, wherein the base frequency for each branch corresponds to a different operating frequency of the compressor.

16. The HVAC system of claim 1, wherein the length of a branch closer to the inlet of the channel is shorter than a branch further from the inlet.

17. The HVAC system of claim 16, wherein the length of each branch closer to the inlet of the channel is shorter than any branch further from the inlet.

18. The HVAC system of claim 1, wherein each branch comprises a bend, wherein the portion of the branch between the open, first end and the bend is oriented at an angle relative to the channel and the portion of the branch between the bend and the fixed, closed end extends substantially parallel to the channel.

* * * * *